United States Patent [19]

Corsi

[11] Patent Number: 5,161,921
[45] Date of Patent: Nov. 10, 1992

[54] METHOD AND EQUIPMENT DESIGNED TO DRILL COUNTERSUNK HOLES ON SURFACES IN ANY POSITION

[75] Inventor: Armando Corsi, Piacenza, Italy

[73] Assignee: JOBS S.p.A., Piancenza, Italy

[21] Appl. No.: 314,911

[22] Filed: Feb. 24, 1989

[30] Foreign Application Priority Data

Mar. 9, 1988 [IT] Italy .................. 44803 A/88

[51] Int. Cl.5 ............................................... B23B 35/00
[52] U.S. Cl. ............................ 408/1 R; 408/98;
  408/95; 408/14; 408/130; 408/57; 408/239 A
[58] Field of Search ................... 408/1, 110–113,
  408/10, 30, 119, 117, 118, 13, 130, 95, 14,
  96–100, 241 S, 57, 702; 227/142; 400/5, 3, 239
  A; 83/941; 279/20

[56] References Cited

U.S. PATENT DOCUMENTS

| | | | |
|---|---|---|---|
| 2,488,992 | 11/1949 | Taylor | 408/112 X |
| 2,607,197 | 8/1952 | Johnson | 408/90 X |
| 2,884,819 | 5/1959 | Roubloff | 408/95 X |
| 2,909,949 | 10/1959 | Winslow | 408/95 X |
| 3,024,030 | 3/1962 | Koch | 279/20 |
| 3,526,158 | 9/1970 | Adams et al. | 408/9 |
| 3,617,141 | 11/1971 | Sullivan | 408/35 |
| 3,689,171 | 9/1972 | Bouzounie | 408/112 |
| 3,767,313 | 10/1973 | Bohoroquez et al. | 408/57 X |
| 4,105,359 | 8/1978 | Schneider et al. | 408/112 |
| 4,157,231 | 5/1979 | Phillips | 408/9 X |
| 4,261,285 | 4/1981 | Pearl | 408/3 X |
| 4,440,529 | 4/1984 | Henslee et al. | 408/130 X |
| 4,530,625 | 7/1985 | Corley et al. | 408/10 X |
| 4,534,682 | 8/1985 | Carlson | 408/702 |
| 4,596,067 | 6/1986 | Raiteri | 408/3 X |
| 4,643,621 | 2/1987 | Fuller | 279/20 X |
| 4,717,291 | 1/1988 | Zafir | 408/13 |
| 4,865,494 | 9/1989 | Gudow | 408/11 X |

FOREIGN PATENT DOCUMENTS

| | | | |
|---|---|---|---|
| 459423 | 9/1949 | Canada | 408/112 |
| 111339 | 7/1964 | Czechoslovakia | 408/112 |
| 72657 | 2/1983 | European Pat. Off. | 408/57 |
| 812595 | 3/1981 | U.S.S.R. | 408/112 |
| 967019 | 8/1964 | United Kingdom | 408/112 |

*Primary Examiner*—Larry I. Schwartz
*Assistant Examiner*—Robert Schultz
*Attorney, Agent, or Firm*—Notaro & Michalos

[57] ABSTRACT

The invention relates to a method and equipment designed to drill countersunk holes on surfaces of unknown positions in which a presser fitted to the tool support is placed against the surface to be drilled, and can move axially in relation to the tool; the presser is used as a limit switch to control tool return.

7 Claims, 3 Drawing Sheets

METHOD AND EQUIPMENT DESIGNED TO DRILL COUNTERSUNK HOLES ON SURFACES IN ANY POSITION

FIELD AND BACKGROUND OF THE INVENTION

This invention relates to a method and device designed to drill countersunk holes automatically to extremely fine tolerances in elements which may be in any position, and in particular in elements whose position cannot be exactly ascertained.

For example, the method in accordance with the invention can be usefully applied in the aeronautical industry, in riveting operations used to fix panels to the ribs which constitute the aircraft structure.

The following description relates particularly to this specific case, although the invention is not limited to the aeronautical industry but could also be used to advantage in other industries such as the automobile industry.

In aircraft contruction, the sheet metal used to make the fuselage and wings is secured to the ribs of the structure by rivets inserted into holes drilled by automatic machine tools.

The various parts must be machined to very fine tolerances; rivets, in particular, must be exactly flush with the outer surface of the wing to reduce drag.

For this reason each hole must be drilled with the highest precision, with tolerances of approx. 20-30 microns in the countersinking depth.

Although current automatic machine tools are extremely precise, this particular type of job presents great difficulties because the holes must be drilled in curved surfaces, and it is a very difficult, laborious job to determine the position with the necessary precision.

Controlling the movements of these machines via software therefore requires the use of complex algorithms, although there is no guarantee that the result will be sufficiently precise, as this also depends on exact pre-positioning of the part to be drilled, which is always difficult to obtain. With known systems the sheet metal to be drilled is placed against the ribs and fixed at a reasonable number of points; the necessary holes are drilled, following which the structure must be dismantled in order to deburr around each hole before riveting and final fixing.

As mentioned, during this job exact positioning of the workpiece is essential, and such positioning is very laborious and extremely difficult to obtain.

There is consequently a felt need in the industry for equipment which enables these holes to be drilled to the required tolerances even when the plate to be drilled is not positioned with the necessary precision.

SUMMARY OF THE INVENTION

For this purpose, this invention offers a method and equipment in which a presser, fitted to the tool support in a precise position, slides axially in relation to it. The presser is brought into contact with the surface to be drilled, and the movement of the tool in relation to the presser is measured to ascertain the drilling depth.

This invention will now be described in detail, by way of example but not of limitation, with special reference to the annexed figures in which:

DESCRIPTION OF THE PREFERRED EMBODIMENT

Figure 1:
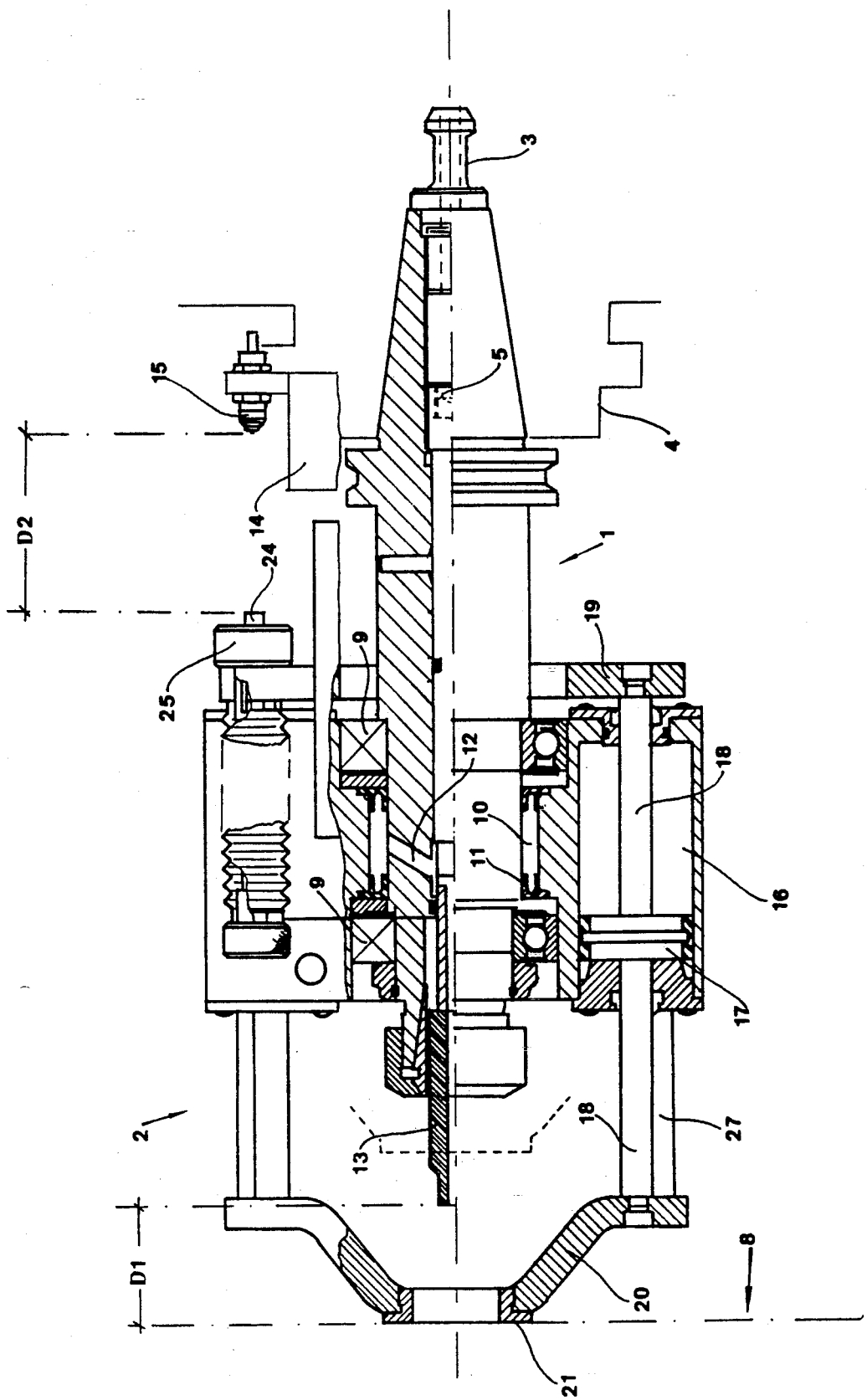
FIG. 1 is a partial cross-section of the drilling device in accordance with the invention.

The drilling device in accordance with the invention comprises a tool carrier assembly marked 1, to which a presser assembly marked 2 is fitted.

Tool carrier 1 is fitted with a shank 3 to fix it to a chuck 4, which is only outlined in the figure.

The inside of shank 3 is hollow to allow access for a regulating spindle 5 with micrometric thread, fitted inside tool carrier 1 at the end; the tool is brought to rest against this spindle at the time of assembly.

By regulating spindle 5, the position of the tool in relation to a given plane, especially in relation to outer edge 8 of the presser, can be adjusted with great precision. The presser unit is fitted to tool carrier 1 on a pair of bearings 9. The devices which make up the presser completely surround the tool carrier in the area between the bearings to form an annular chamber 10, closed at the ends by seals 11. Chamber 10 is connected via a pipe 12 to tool 13, which is hollow.

A pair of microswitches 15 are fitted to support block 14 (outlined in the figure) which is fixed to a machine part that also rotatably carries the machine chuck.

Block 14 also contains pipes designed to carry coolant to annular chamber 10.

Presser assembly 2 comprises a pair of piston and cylinder combinations which are formedly cylinders 16 with pistons 17 and piston rods 18 projecting from both heads of the cylinders. Rod 18 is connected on one side to a support plate 19 and on the other to a shaped presser foot 20 which has a bushing 21 screwed to its front end. This bushing acts as the actual presser element, and the tool passes through it to drill the hole.

The interior of cylinders 16 is connected in a known way to pressurized fluid distributors fitted to support block 14; the pressure can be preset by operating a regulator 6 of known type, and is indicated by a pressure gauge 7.

The same pipes that connect the block to cylinders 16 secure the presser and prevent it from being drawn into rotation by friction together with the tool carrier.

Plate 19 and shaped presser foot 20 are also connected by a pair of guide shafts 27.

The assembly constituted by plate 19, shaped presser foot 20, guide shafts 27 and rods 18 of pistons 17 can therefore move parallel to the tool carrier axis.

Figure 2:
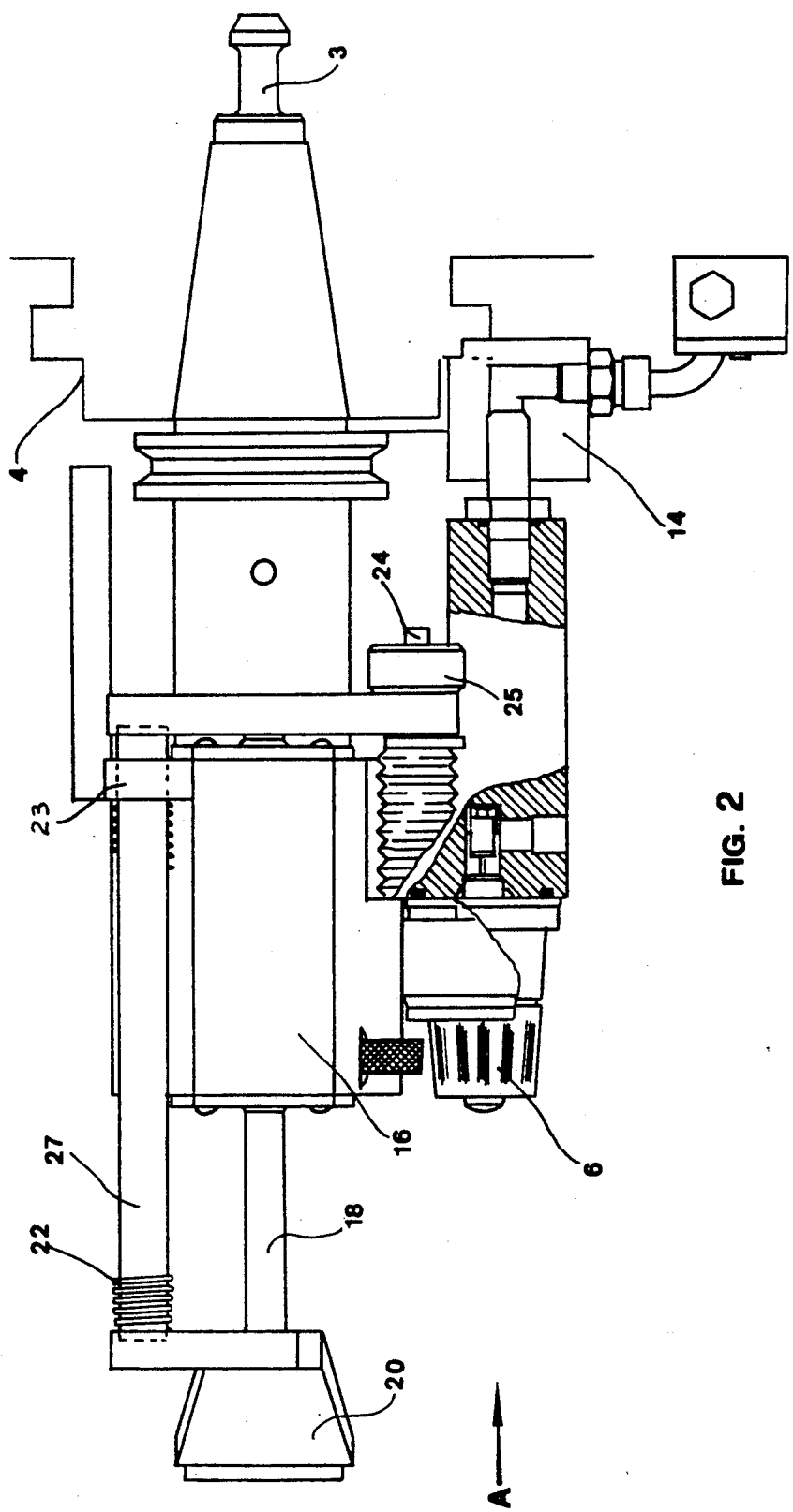
FIG. 2 is a partial cross-section of the tool illustrated in FIG. 1, at right angles to the view shown in the previous figure.
Figure 3:
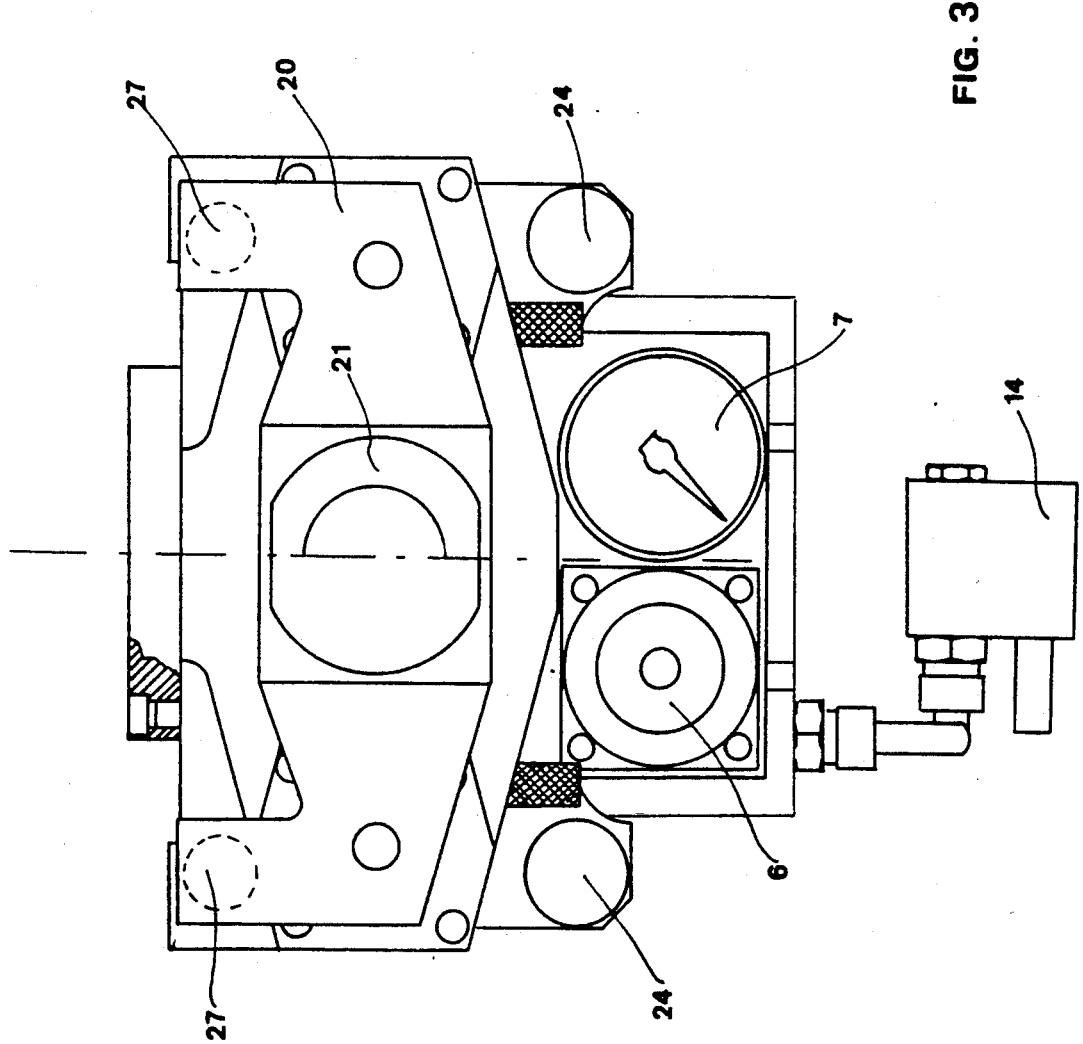
FIG. 3 is a view of the same device in the direction of arrow A in FIG. 2.

A pair of spiral springs 22, fitted around respective guide shafts 27, acts on one side against shaped presser foot 20 and on the other against a reference plate 23 integral with cylinders 16, keeping the presser at a distance from the tool, in the position illustrated in the figures. In FIG. 2 only the upper and lower portions of one spring 22 are illustrated on the shaft 27.

A pair of micrometric screws 24, secured in the required position by stay elements 25, is fitted to support plate 19. The axis of screws 24 coincides with that of microswitches 15, which in turn are connected to devices of known type which control the chuck movements.

The unit operates as follows:

Fit tool 13 to tool carrier 1 and adjust its position in relation to the outer edge of bushing 21 by regulating micrometric screw 5. This position can be checked with great precision, e.g. with scanning systems.

To regulate the drilling depth adjust screws 24, regulating their position in relation to plate 19 so that distance D2 between the projecting end of a screw and the related microswitch 15 is equal to distance D1 between the tool and the edge of bushing 21 plus the drilling depth.

The position of the second screw should preferably be regulated so that it activates the related microswitch, not simultaneously with the previous one but after the tool has advanced a further distance, though less than the required tolerance for the drilling depth.

Assume, for example, that distance D1 between the tool and the edge of bushing 21 is 50 mm, and that the hole must be 4 mm deep with a tolerance of plus three-tenths of a millimeter.

Distance D2 between the first of screws 24 and the related microswitch will be 54 mm, while the distance of the second screw will be 54 mm plus three-tenths mm. In this case the second microswitch operates as a safety device in the event of a malfunction in the first by maintaining the drilling depth within the required tolerances at all times.

Once these calibration operations have been performed, operate regulator 6 to set the pressure inside cylinders 16 suitably according to the pressure to be exerted on the plates to be drilled; this pressure can be read on pressure gauge 7.

The tool carrier can now be fitted to the chuck and drilling operations can begin.

The chuck advances to bring presser bushing 21 into contact with the parts to be drilled.

The pressure in chambers 16 keeps the plates in close contact with one another, while the tool carrier continues to advance, contrasting the force exerted by the pressure on pistons 17.

The fact that the plates are kept pressed against one other during drilling means that a burr is not formed.

The tool carrier and cylinders 16 keep advancing, sliding along rods 18 and shafts 27 until the required drilling depth is reached and the first of microswitches 15 comes into contact with the related screw 24.

The chuck is then sent back and the pressure in the cylinders returns the presser to the starting position, setting up the machine for another operating cycle. (Springs 22 serve to keep the presser in this position even when the unit is moved).

Bushing 21 is of the interchangeable type so that its inner diameter can be adapted to the tool dimensions because, in order to achieve greater precision, the pressure on the parts drilled should be exerted as close as possible to the hole.

An expert in the field could devise numerous modifications and variations, all of which should be deemed to fall within the ambit of this invention.

I claim:

1. A device for drilling a hole to a controlled depth in a surface, in any position in relation to a direction of advance of a cutting tool for drilling the hole, comprising:

a support block carrying a rotatable chuck and movable in a direction of advance toward the surface;

a tool carrier mounted to the chuck for rotation on the support block;

at least one limit switch mounted on the support block;

a cutting tool connected to the carrier for drilling a hole in the surface with rotation of the tool carrier and with movement of the support block in the advance direction;

a presser assembly axially fixed to and rotatable on the tool carrier;

means for preventing relative rotation between the presser assembly and the support block;

a presser slidably mounted to the presser assembly for movement parallel to the direction of advance;

adjustable position means connected to the presser and in a position for engaging the limit switch with relative movement between the presser and the tool carrier, the adjustable position means being adjustable for changing the amount of relative movement between the presser and the tool carrier before engagement of the adjustable position means with the limit switch;

pressure fluid activated means operatively connected between the presser and the presser assembly for receiving a pressure fluid for pressing the presser against the surface with a selected and adjustable amount of pressure when the tool carrier is moved toward the surface by movement of the support block, and for stopping movement of the support block in the direction of advance when the adjustable position means engages the limit switch said pressure fluid activated means comprising a pair of pistons fixed to the presser on opposite sides of the tool carrier, and a pair of cylinders mounted to the tool carrier for slidably receiving the respective pistons; and pressure regulating means connected to the pressure fluid activated means for regulating the pressure of the pressure fluid.

2. Device in accordance with claim 1 including a return spring for returning the presser to an initial position with respect to the tool carrier when the support block is moved in a direction opposite to the direction of advance.

3. Device in accordance with claim 1, including a piston support forming a sealed annular chamber around the tool carrier connected on one side to equipment designed to inlet coolant and on the other side to a pipe designed to convey the coolant toward the tool.

4. Device according to claim 1 wherein the adjustable position means comprises a reference plate fixed to the pistons and a micrometric screw engaged to the reference plate in a position for engaging the limit switch.

5. Device in accordance with claim 1, in which the presser includes an interchangeable bushing designed to allow the passage of the tool.

6. A method of drilling a hole to a controlled depth into a surface in any position, using a tool which is rotated on a tool axis by a tool carrier for drilling the hole, said tool carrier being fixed to and rotated by a chuck, the method comprising:

rotatably mounting a presser assembly (2) to the tool carrier (1) for relative rotation between the presser assembly and the tool carrier around the tool axis;

a presser foot (20) being slidably mounted to the pressure assembly for relative sliding movement between the pressure foot and the presser assembly along the tool axis;

connecting a piston and cylinder combination (16, 17) between the pressure assembly and the presser foot for receiving a pressure fluid to press the presser foot against the surface when the tool carrier is moved toward the surface along the tool axis;

rotating the tool carrier for rotating the tool around the tool axis;

moving the tool carrier toward the surface along the tool axis;

supplying the pressure fluid to the piston and cylinder combination at a selectable and adjustable pressure to press the presser foot against the surface at any position to be drilled by an adjustable and selectable pressure, movement of the tool carrier along the tool axis engaging the pressure foot against the surface and subsequently moving the pressure foot with respect to the tool carrier along the tool axis until the tool drills a hole in the surface;

detecting a selected amount of relative movement between the pressure foot and the tool carrier which is indicative of the drilling of a hole in the surface by the tool up to a controlled depth by mounting a sensor (15) in a path of movement of at least part (24) of the presser foot as the pressure foot moves with respect to the tool carrier along the tool axis, prepositioning the presser foot with respect to the tool carrier before the tool carrier is moved toward the surface, and moving the tool carrier to engage the presser foot against the surface and thereafter to advance the tool carrier for drilling the hole until the part (24) of the presser foot contacts the sensor (15); and upon reaching the selected amount of relative movement between the presser foot and the tool carrier, discontinuing movement of the tool carrier toward the surface and starting movement of the tool carrier away from the surface along the tool axis.

7. A method according to claim 6 wherein a plurality of sheets are to be drilled, and including pressing the sheets together by pressing the presser foot against the surface by the adjustable and selectable presser.

* * * * *